Sept. 30, 1952     D. A. WANGELIN     2,612,063
MACHINE FOR FORMING TEETH FOR PEG TOOTH HARROWS
Filed June 25, 1948     3 Sheets-Sheet 1

INVENTOR.
DONALD A. WANGELIN
BY
ATTORNEYS

Sept. 30, 1952 D. A. WANGELIN 2,612,063
MACHINE FOR FORMING TEETH FOR PEG TOOTH HARROWS
Filed June 25, 1948 3 Sheets-Sheet 2

INVENTOR.
DONALD A. WANGELIN
ATTORNEYS

Sept. 30, 1952   D. A. WANGELIN   2,612,063
MACHINE FOR FORMING TEETH FOR PEG TOOTH HARROWS
Filed June 25, 1948   3 Sheets-Sheet 3
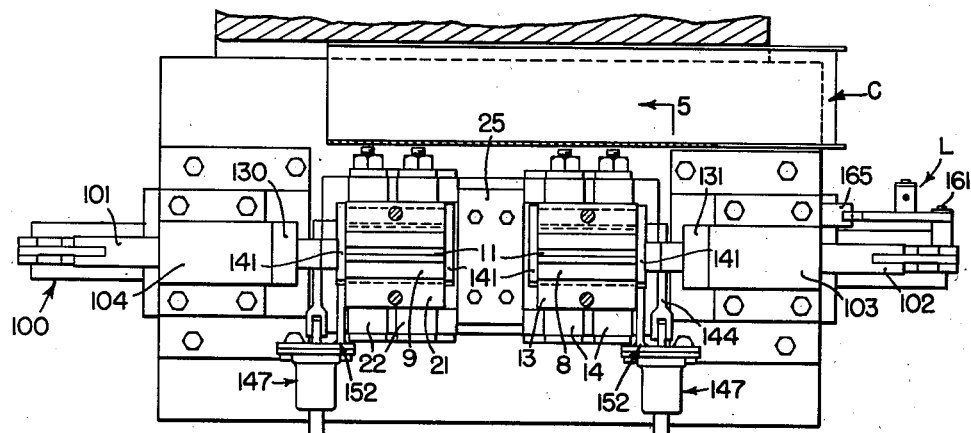
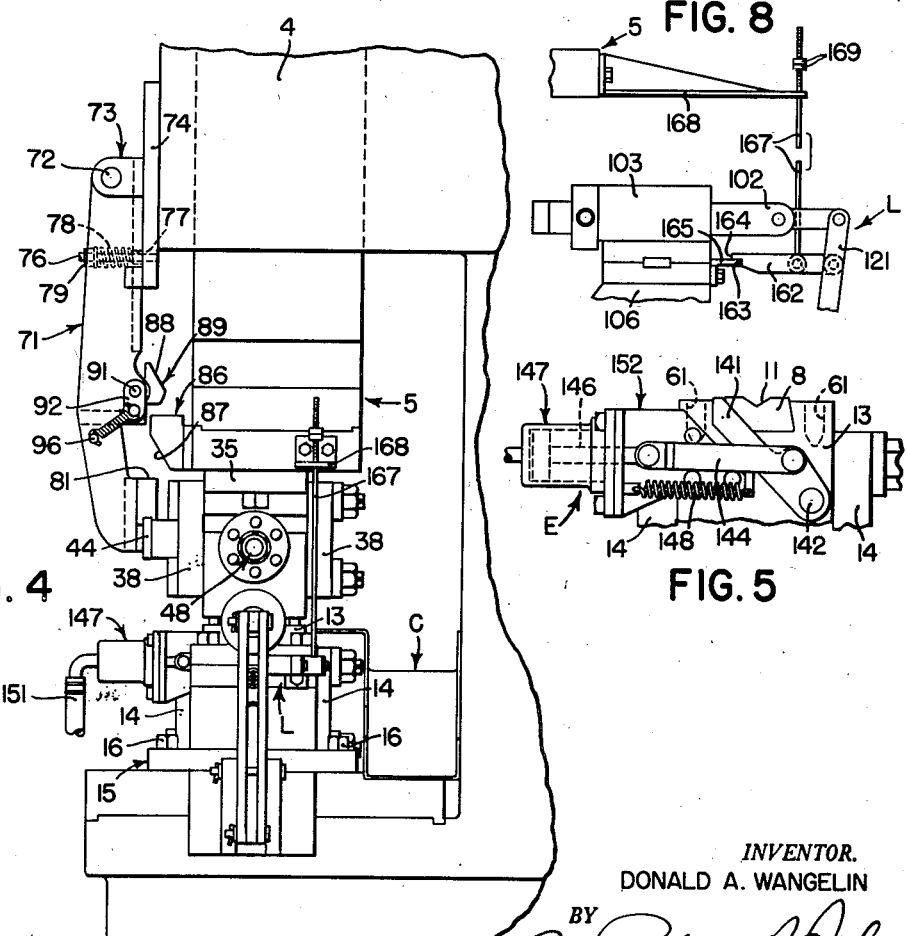
INVENTOR.
DONALD A. WANGELIN
BY
ATTORNEYS Patented Sept. 30, 1952

2,612,063

UNITED STATES PATENT OFFICE 2,612,063

MACHINE FOR FORMING TEETH FOR PEG TOOTH HARROWS

Donald A. Wangelin, Rock Island, Ill., assignor to Deere & Company, Moline, Ill., a corporation of Illinois Application June 25, 1948, Serial No. 35,095

21 Claims. (Cl. 76—1)

The present invention relates generally to machines for forming pointed articles and more particularly to machines for forming pointed harrow teeth used in peg tooth harrows.

The object and general nature of the present invention is the provision of a new and improved method of and means for forming pointed harrow teeth by pulling a tooth bar heated in the central portion thereof until the bar is separated into two sections, the act of pulling apart the sections automatically forming the pointed ends whereby each section thus formed becomes a harrow tooth of the desired pointed configuration without further operation. More specifically, it is an important feature of this invention to provide new and improved mechanism applicable to a power press by which harrow tooth bar blanks heated to the desired degree may be pulled apart into two sections easily, rapidly and economically.

It is a further feature of this invention to provide means for automatically forming heads on the ends of the harrow teeth substantially concomitantly with the formation of the pointed ends as aforesaid.

These and other objects and advantages of the present invention will be apparent to those skilled in the art after a consideration of the following detailed description, taken in conjunction with the accompanying drawings, in which:

Figure 3 is a view taken generally along the line 3—3 of Figure 1, showing the lower toothbar receiving dies or grippers, with associated ejecting and heading mechanism.

Figure 4 is a fragmentary side view of the press and tooth forming means shown in Figure 2.

Figure 5 is a fragmentary view, taken generally along the line 5—5 of Figure 3, showing the harrow tooth ejecting means.

Figure 8 is a fragmentary front view showing the preferred means to prevent the press equalizing means from closing before the ejectors completely eject the formed teeth.

Figures 1, 6:
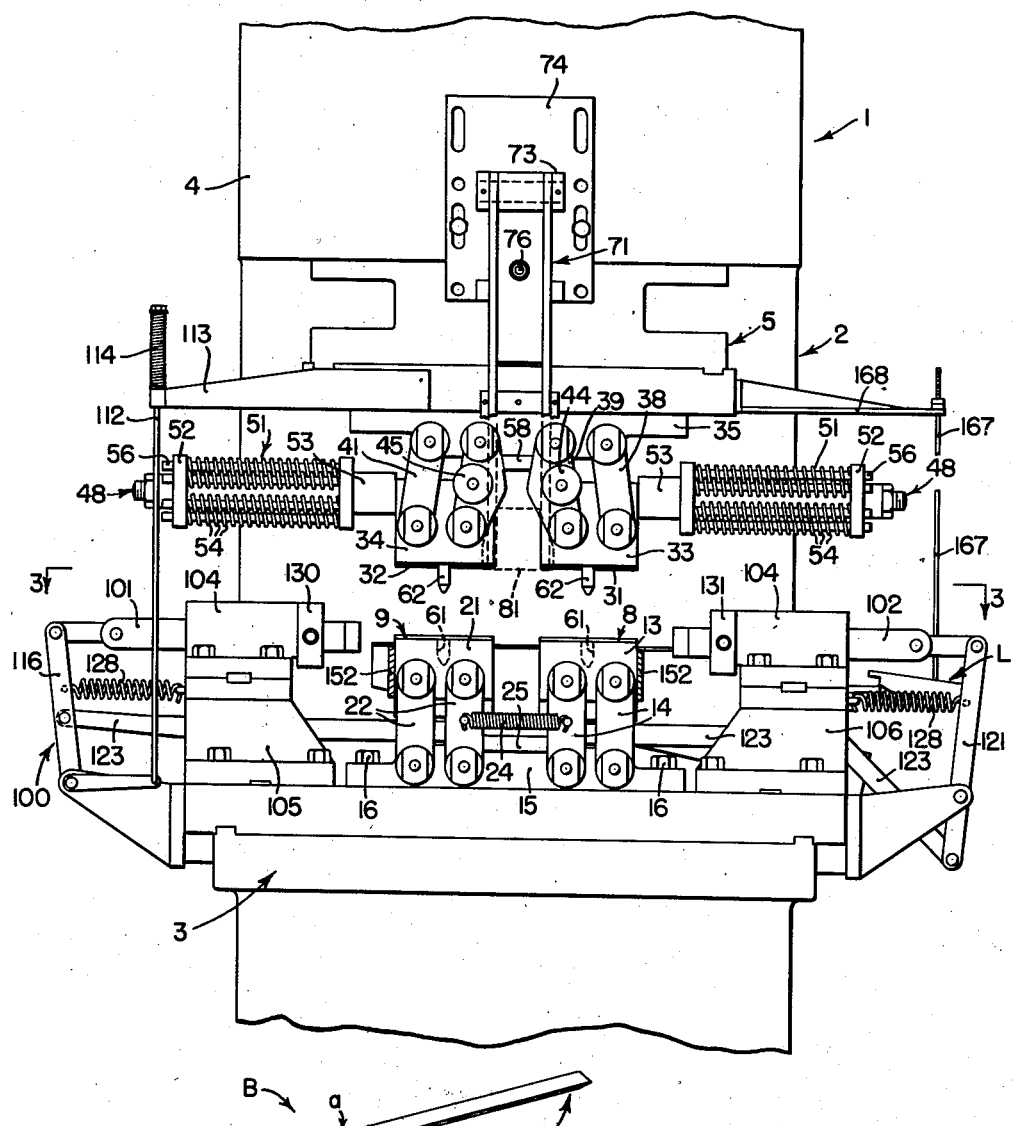
Figure 1 is a partial front view of a power press equipped with the preferred form of the present invention, the parts being shown in a position adapted to receive a heated harrow tooth bar or blank from which two harrow teeth can be formed.
Figure 6 is a perspective view of a bar or blank from which two harrow teeth may be formed.

Referring now to the drawings, the press in which the principles of the present invention have been incorporated is indicated in its entirety by the reference numeral 1 and comprises a frame 2 which includes a relatively stationary base 3 and an upper section 4 in which a vertically movable head 5 is mounted for up and down movement under the control of power actuated means (not shown).

The base 3 of the press carries a pair of laterally shiftable right and left hand bar-receiving dies or grippers 8 and 9, each having a bar-receiving groove or recess 11 formed therein. The die 8 is mounted in a block or carrier 13, and the latter is supported by four parallel links 14 pivotally connected at their upper ends to opposite sides of the die carrier 13 and at their lower ends to the right hand portion of a bed plate 15 which is secured, as by stud bolts 16, to the base 3. Similarly, the left hand lower die or gripper 9 is mounted in a block or carrier 21 which is supported on the base 3 by means of four parallel links 22 pivotally connected at their upper ends to the block 21 and at their lower ends to the left hand portion of the bed plate 15. A spring 24 connects the two adjacent links 14 and 22 and thereby resiliently holds the links just mentioned up against a stop or abutment 25. This determines the normal or inactive position of the dies or grippers 8 and 9, as best shown in Figures 1 and 3.

The vertically shiftable head 5 carries a similar set of link-mounted bar-receiving dies or grippers. The latter members are indicated by the reference numerals 31 and 32 and are mounted, respectively, in carrier blocks 33 and 34 which are suspended from a bed plate 35 carried by the head 5 by means of parallel links generally similar to those described above. For example, the block 33 is supported by means of two pairs of parallel links 38 and 39 pivotally connected at their upper ends to the right hand portion of the bed plate 35 and pivotally connected at their lower ends to the block 33. The left hand die carrier or block 34 is supported from the bed plate 35 by parallel links 41 and 42 pivotally connected at their upper ends to the bed plate 35 and at their lower ends to the block 34. The front adjacently disposed links 39 and 42 are provided with rollers 44 and 45 for a purpose which will be referred to later. The two upper die carrier blocks 33 and 34 are apertured to receive an elongated bolt 48 which extends at its opposite ends beyond the sides of the press 1, as best shown in Figure 1. A coil spring assembly 51 is disposed about the right hand portion of the bolt 48 and lies between an outer plate 52 and an inner abutment bushing 53. Each spring 54 of the assembly 51 is mounted on a supporting rod 56 carried by the head 52 and the abutment bushing 53. Disposed about the left hand portion of the bolt 48 is a similar spring assembly, and since the latter is substantially identical for all practical purposes with the assembly just described, the same reference numerals have been used. The two spring assemblies 51 exert a relatively powerful force through the abutment bushing 53 against the die blocks 33 and 34, normally holding the parts in the position shown in Figure 1 with the links 38, 39, 41 and 42 in a slightly angled position with the adjacent links up against an abutment block 58 between the two inner pairs of links 42 and 44. The lower faces of the die members or grippers 31 and 32 are formed with the transverse bar-receiving groove or recess complementary to the groove or recess 11 (Figure 5) of the lower dies or grippers. Each of the lower die carriers 13 and 21 is provided with a dowel-receiving socket 61 in which a mating dowel pin 62 carried by the cooperating upper die carrier, 33 or 34, is adapted to be received. When the dowel pins 62 enter the recesses 61 the upper and lower die members move laterally together relative to the press when the head 5 carrying the upper die or gripper members, moves downwardly, as will be referred to in detail later.

A vertically disposed arm member 71 is pivotally mounted at 72 on a bracket 73 carried by an attachment plate 74 adjustably secured to the upper portion 4 of the press frame. The latter carries a stud bolt 76 which extends outwardly through an aperture 77 in the web of the arm 71. A spring 78 is disposed about the bolt 76 and acts between the outer face of the arm 71 and a nut 79 on the outer end of the bolt 76, whereby the arm 71 is biased for movement inwardly, to the right as viewed in Figure 4. The lower end of the arm 71 carries a cam member 81 which tapers upwardly, as shown in dotted lines in Figure 1. The cam member 81 cooperates with the rollers 44 and 45 so as to keep the upper links from swinging laterally inwardly when the press head 5 moves upwardly, as will be explained below in detail.

Figures 2, 7:
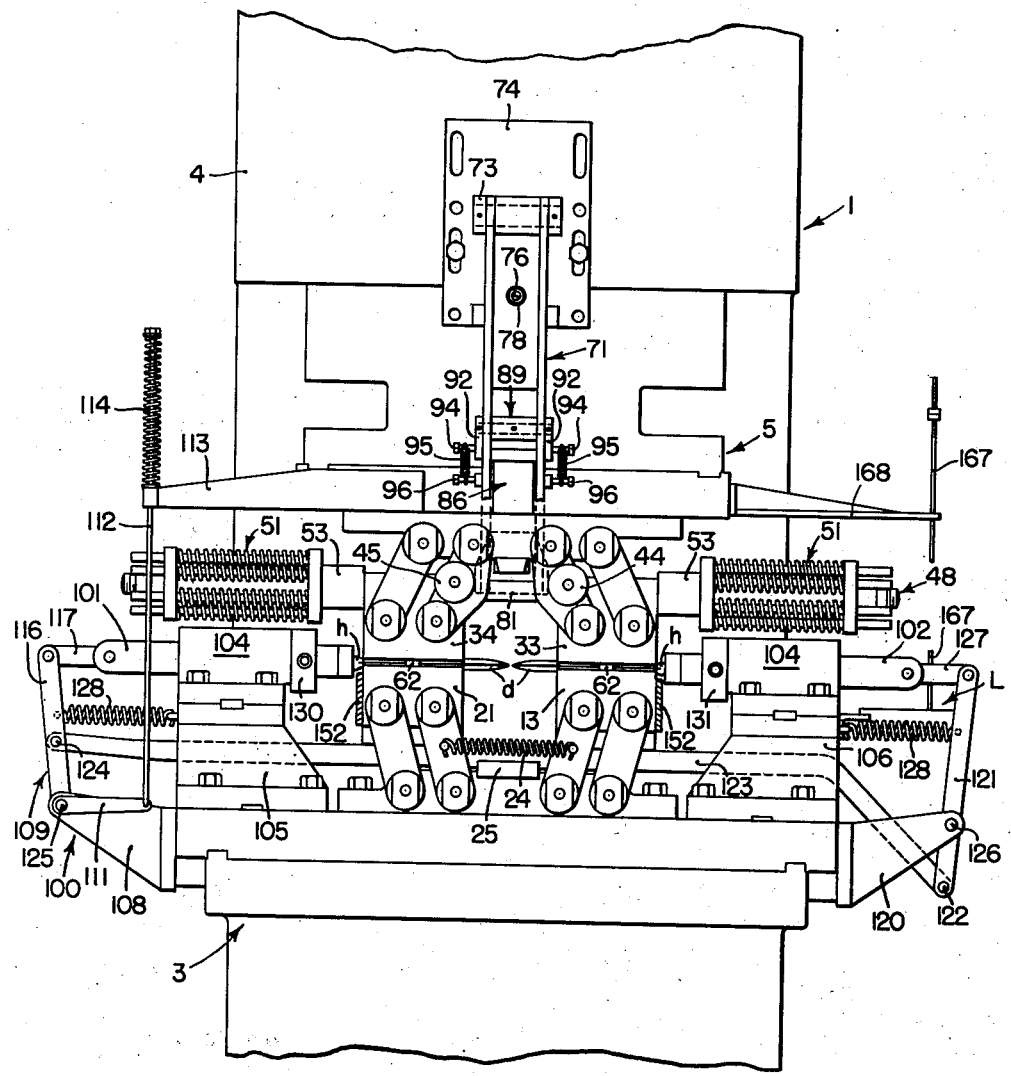
Figure 2 is a view similar to Figure 1, showing the head of the press in its lower position in which the heated tooth bar blank has been pulled apart, thus forming two harrow teeth and at the same time forming a head on each tooth.
Figure 7 is a similar perspective view showing the harrow teeth after their formation by the means and method of the present invention.

In order to hold the cam member 81 out of engagement with the rollers 44 and 45 when the press head moves downwardly, a cam member 86 is mounted on the head 5, as best shown in Figure 4, and includes an angled section 87 which cooperates with a similarly angled portion 88 formed on a detent member 89 pivotally mounted, as at 91, on the lower end of the arm 71. A pair of spring arms 92 are fixed to rock with the member 89, there being one of such arms at each side of the cam arm 71, as best shown in Figure 2. Each of the arms 92 carries an outwardly extending pin 94 to which one end of a spring 95 is connected. The other end of each of the springs is connected by an anchor pin 96 to the arm 71.

The press 1 is equipped with centering mechanism indicated in its entirety by the reference numeral 100. Such centering mechanism comprises a pair of plungers 101 and 102 mounted, respectively, in sleeves 103 and 104. The sleeves are supported on the base 3 of the press by pedestal members 105 and 106. A bracket 108 is mounted at the left side (Figure 2) of the base 3 and carries a bell crank 109, one arm 111 of which is connected by a rod 112 to an actuating extension 113 fixed to the vertically movable head 5 of the press. A cushioning spring 114 is disposed between the extension 113 and the upper end of the rod 112. The other arm 116 of the bell crank 109 is connected by a short link 117 to the left hand plunger 101. At the other side of the press the base 3 carries a bracket 120 on which a lever 121 is rockably mounted. The lower end of the lever is pivotally connected, at 122, to an equalizing link 123 which extends across the press and is connected, as at 124, to the bell crank arm 116 at a distance above the pivot mounting 125 of the bell crank 109 substantially equal to the distance between the pivot mounting 126 of the lever 121 and the lower link pivot 122 whereby the arm 116 and lever 121 move angularly in opposite directions but substantially the same amount. The upper end of the lever 121 is connected by a link 127 to the outer end of the right hand plunger 102. Springs 128 act between the pedestals 105 and 106 and the arm 115 and lever 121 for urging the plungers 101 and 103 laterally inwardly when the press head 5 is lowered. When the press head 5 is raised the extension 113 acts through the spring 114 and rod 117 to rock the bell crank 109 in a counterclockwise direction (Figure 2) and the right hand lever 121 in a clockwise direction, whereby the plungers 101 and 102 are drawn outwardly against the tension of the springs 128. The outward movement of the plungers 101 and 102 are limited by heavy abutment collars 130 and 131 which are fixed to the inner ends of the plungers 101 and 102, in a position to engage the inner ends of the sleeves 103 and 104, by shear pins or the like.

The ejecting mechanism E is best shown in Figure 5 and comprises an arm 141 pivotally mounted, as at 142, on each side of each of the lower die blocks 13 and 21. Each ejector arm 141 is operated by a link 144 which at one end is pivoted to the arm 141 and at the other end is pivotally connected with the piston rod 146 of an air cylinder 147. Preferably the two ejector arms 141 at each side of the associated die block are interconnected by being secured to the pivot shaft 142, whereby both ejector arms 141 are operated simultaneously. The arms 141 are normally returned to their inactive position, as shown in Figure 5, by a spring 148. Air under pressure is delivered at the proper timed interval by suitable valve mechanism controlled by the movement of the press head 5. Arrangements of this kind are conventional in power presses and need not be described further. The ejector arms 141 at each side of the die blocks 13 and 21 project each tooth section $d$ into a chute C at the rear side of the dies or grippers. Air pressure, controlled as aforesaid, is conducted to each of the ejector cylinders 147 by a hose line 151 (Figure 4), and each air cylinder 147 is supported in position on an L-shaped bracket 152.

In order to prevent the centering mechanism 100, acting under the influence of the springs 128, from moving the formed teeth $d$ out of position before the ejecting mechanism E can operate to shift the formed teeth $d$ over into the chute C, I provide locking mechanism L, best shown in Figures 3, 4 and 8. The locking mechanism acts to hold the equalizing plungers 101 and 102 in their outer positions until such time as the ejector arms 141 eject the teeth from the dies. An extension pivot 161 is carried at the rear side of the right hand centering lever 121 and swingably receives a cam arm 162 which is formed with an abutment face 163 and a stop extension 164 engageable with an abutment 165 which is rigidly fixed to the pedestal member 106. A link 167 is pivotally connected at its lower end to the cam arm 162 and at its upper end passes through an aperture in the outer end of a bracket 168 which is fixed to the vertically reciprocable head 5. Stop means in the form of a pair of lock nuts 169 are carried in the proper position at the upper end of the link 167 so that when the head 5 is in its lowered position the arm 162 acts between the abutment 165 and the centering lever 121 so as to hold the centering arms 116 and 121 in their outermost positions until the ejectors discharge the formed harrow teeth $b$ into the chute C. After this operation has occurred, a further upward movement of the head 5 brings the outer end of the bracket 168 into contact with the stop nuts 169 and thereafter raises the arm 162 so as to swing the outer end upwardly out of engagement with the abutment 165 and thus permits the equalizer arms 116 and 121 of the centering mechanism 100 to assume their normal position. This action does not interfere with the normal operation of the centering mechanism under the control of the bracket 113, spring 114 and link 112 (Figure 1).

The operation of the machine described above is substantially as follows:

Stock pieces in the form of diamond shaped bars B (Figure 6) are heated at their central and end portions, as indicated at $a$, and $b$ and $c$, respectively, in any suitable form of furnace. The stock piece B is then placed in the die recesses 11 in the die members 8 and 9, the parts of the press 1 being in the positions shown in Figure 1. Next the press is operated by suitable means to cause the head 5 to lower. As the head 5 lowers the cam surface 87 (Figure 4) rides against the surface 88 on the member 89, which is locked by suitable means against clockwise rotation from the position shown in Figure 4. The continued downward movement of the head 5 causes the arm 71 to swing outwardly, moving the cam member 81 away from the rollers 44 and 45. As the dowel pins 62 on the upper die members 33 and 34 enter the sockets 61 in the lower die members 13 and 21, the right and left hand pairs of upper and lower die members are locked together for lateral movement, which movement is however opposed by the spring units 51 and associated parts. When the upper die members are moved downwardly substantially into contact with the lower die members the ends of the blank or bar B are firmly engaged between the upper and lower die members. Continued downward movement of the head 5 thereafter causes the pairs of bar-gripping dies to move laterally outwardly away from one another, or transversely with respect to the direction of relative movement of the head 5 supporting the upper dies and the base 3 supporting the lower dies, as shown in Figure 2, while still gripping the end portions of the stock piece B. The opposite lateral outward movement of the pairs of dies or grippers stretch or attenuate the heated central portion $a$ of the bar B and the parts are so arranged that the downward movement of the head 5 and the laterally outward movement of the parallel links and die members can continue until the bar B is separated into two sections, each forming a harrow tooth. The separated sections are shown in Figure 7 and also in Figure 2. The bar B is heated to such a point that when the attenuation and final separation occurs, each tooth, indicated by the reference character $d$ in Figure 7, is pointed sufficiently accurately for use in a peg tooth harrow without further work.

During the final outward movement of the die blocks the outer ends of the tooth pieces $d$ come into contact with the inner ends of the plungers 101 and 102. The abutment blocks 130 and 131 are so placed on the plungers 101 and 102 that as the final downward movement of the press head occurs the outer end of each tooth section $b$ is upset, forming a head $h$. The lower links 14 and 22 are vertical when the dies are separated (Figure 1) and have less angularity than the upper links 38 and 41 when the press head is lower (Figure 2). This is for the purpose of eliminating so far as possible downward movement of the heads $h$ of the teeth relative to the inner ends of the plungers 101 and 102 during the heading operation. If the formation of heads on the harrow teeth is not required or desired, the abutment collars 130 and 131 may be omitted, and similarly the step of heating the outer ends of the bar B may be omitted where heads are not required. It will be noted, further, that the head 5 acting through the sets of parallel links exerts a force on the heated bar B which has two components, namely, a vertical component which acts to grip or clamp the ends of the bar B between the upper and lower dies and a laterally outwardly directed component which stretches and attenuates the central or heated portion of the bar B and forms the pointed ends on the teeth $d$.

As best shown in Figure 4, the lowermost movement of the head 5 causes the cam member 86 to move downwardly below the cam member 89 on the arm 71. This permits the cam 81 at the lower end of the arm 71 to move into a position between the rollers 44 and 45 at a time when the die blocks are in their laterally separated positions, as shown in Figure 2, the position of the cam member 81 being shown in this figure in dotted lines. As the press head 5 moves upwardly the upper edge of the cam member 86 comes into abutting relation with the cam member 89, but since the latter is free to rock in a counterclockwise direction (Figure 4) the cam 81 remains between the rollers 44 and 45. The cam member 81 on the lower end of the arm 71 therefore serves to prevent the two sets of upper and lower die members from approaching one another while the harrow tooth sections $b$ are still held in the dies and the inner pointed ends still hot. If while the ends were still hot the teeth $d$ were permitted to engage there might be some possibility that the two sections $d$ would be reunited. Therefore, the function of the cam member 81 remaining between the rollers 44 and 45 to hold the die members apart until the teeth $d$ can be ejected from the press is important.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A device for shaping heated metal pieces, comprising a pair of grippers adapted to grip said heated metal piece, a pair of relatively movable supports movable toward and away from one another, link means pivoted to each gripper and the adjacent support and of such length that when said grippers engage a piece said link means are disposed at an angle to one another whereby when one of said supports is moved toward the other one component of force causes said grippers to clamp said piece therebetween and another component of force moves said piece laterally, and means responsive to said lateral movement for shaping said piece.

2. A device for shaping heated metal pieces, comprising a pair of grippers adapted to grip said heated metal piece, a pair of relatively movable supports movable toward and away from one another, link means pivoted to each gripper and the adjacent support and of such length that when said grippers engage a piece said link means are disposed at an angle to one another whereby when one of said supports is moved toward the other one component of force causes said grippers to clamp said piece therebetween and another component of force moves said piece laterally, and an abutment against which the outer end of said piece is brought and shaped by said lateral movement of said grippers.

3. A device for shaping heated metal pieces, comprising two pairs of grippers adapted to grip the end portions of said heated metal piece, a pair of relatively movable supports movable toward and away from one another, link means pivoted to each gripper and the adjacent support and of such length that when said grippers engage a piece said link means are disposed at an angle to one another and the link means at one end of said piece diverge relative to the link means at the other end of said piece, whereby when one of said supports is moved toward the other one component of force causes said grippers to clamp said piece therebetween and another component of force moves one pair of grippers, at one end of said piece, laterally away from the other pair of grippers, at the other end of said piece, so as to separate said heated metal piece into two parts and shape the inner ends of said parts by attenuation.

4. A device for shaping heated metal pieces, comprising two pairs of grippers adapted to grip the end portions of said heated metal piece, a pair of relatively movable supports movable toward and away from one another, link means pivoted to each gripper and the adjacent support and of such length that when said grippers engage a piece said link means are disposed at an angle to one another and the link means at one end of said piece diverge relative to the link means at the other end of said piece, whereby when one of said supports is moved toward the other one component of force causes said grippers to clamp said piece therebetween and another component of force moves one pair of grippers, at one end of said piece, laterally away from the other pair of grippers, at the other end of said piece, so as to separate said heated metal piece into two parts and shape the inner ends of said parts by attenuation, and a pair of abutments at the outer ends of said piece against which said ends are brought by the separating movement of said grippers for upsetting said ends.

5. Means for forming harrow teeth or the like from stock pieces each having a length equal substantially to the length of two of said teeth, which means comprises an upper pair of dies, a lower pair of dies, sets of parallel link means connecting said upper and lower dies to the movable head and relatively stationary base of a power press, whereby the dies of each pair are adapted to be moved toward or away from each other, means for causing the upper and lower dies at the same side of the press to move laterally together, one set of said parallel link means being disposed at an acute angle to the line of movement of the press head whereby there is a component of the movement of the dies toward one another to cause said dies to separate, and means for imposing a biasing force against said dies so as to yieldably resist their separating movement and thus increase the forces with which said dies engage a stock piece therebetween.

6. Means for forming harrow teeth or the like from stock pieces each having a length equal substantially to the length of two of said teeth, which means comprises an upper pair of dies, a lower pair of dies, sets of parallel link means connecting said upper and lower dies to the movable head and relatively stationary base of a power press, whereby the dies of each pair are adapted to be moved toward or away from each other, dowel pin means carried by one of said pairs of dies, the other of said pairs of dies having pin-receiving sockets, said pins being adapted when the head of the press is brought toward the base of the press to enter into said sockets so as to cause the upper and lower dies at the same side of the press to move laterally together, one set of said parallel link means being disposed at an acute angle to the line of movement of the press head whereby there is a component of the movement of the dies toward one another to cause said dies to separate, and means for imposing a biasing force against said dies so as to yieldably resist their separating movement and thus increase the forces with which said dies engage a stock piece therebetween.

7. Means for stretching an elongated heated metal bar or the like, comprising means for gripping one end of said heated bar, means for gripping the other end of said bar, said two means being laterally separable in the direction of the length of said bar, a shiftable power actuated head movable toward said means in a direction generally perpendicular to said bar, and a pair of link means pivoted to said head and said two means in diverging relationship whereby when said head is moved toward said bar there is a component of force which causes said gripping means to separate, thus stretching said bar.

8. Means for stretching an elongated heated metal bar or the like, comprising a pair of opposed grippers for gripping one end of said heated bar, a second pair of opposed grippers for gripping the other end of said bar, a pair of relatively movable supports, one being movable toward the other, and laterally swingable link means connecting said grippers to said supports and arranged at an angle whereby said grippers receiving one end of said bar move away from the grippers receiving the other end of said bar when said one support is moved toward the other support.

9. A machine for forming harrow teeth or the like from stock pieces each having a length equal substantially to the length of two teeth, which machine comprises a press having a stationary base and a head movable by power toward and away from said base, a pair of stock piece receiving dies carried by each of said head and base, said pairs of dies being formed to grip the ends of a stock piece therebetween, means for mounting the dies of each of said pair of dies on the associated base or head for lateral movement toward and away from each other, said means being constructed and arranged so that movement of said head toward said base causes the dies of each pair to separate laterally, and means for resiliently opposing said separating movement whereby when said head approaches said base there is a component of force which causes said dies to grip the ends of said stock piece whereby the aforesaid separating movement imparted to the dies causes said stock piece to be pulled apart into two sections.

10. Means for forming harrow teeth or the like from stock pieces each having a length equal substantially to the length of two teeth, which means comprises the combination with a press having a stationary base and a head movable by power toward and away from said base, of a pair of stock piece receiving dies carried by each of said head and base, said pairs of dies being formed to grip the ends of a stock piece therebetween, means for mounting the dies of each of said pair of dies on the associated base or head for lateral movement toward and away from each other, said means being constructed and arranged so that movement of said head toward said base causes the dies of each pair to separate laterally, and means for resiliently opposing said separating movement whereby when said head approaches said base there is a component of force which causes said dies to grip the ends of said stock piece whereby the aforesaid separating movement imparted to the dies causes said stock piece to be pulled apart into two sections.

11. Means for forming harrow teeth or the like from stock pieces each having a length equal substantially to the length of two teeth, which means comprises normally spaced apart pairs of stock piece receiving dies, one pair being adapted to be mounted on the stationary base of a power press and the other pair being adapted to be mounted on the movable head of said press, said pairs of dies being formed to grip the ends of a stock piece therebetween, means for mounting the dies of each of said pair of dies on the associated base or head for lateral movement toward and away from each other, said means being constructed and arranged so that movement of said head toward said base causes the dies of each pair to separate laterally, and means for resiliently opposing said separating movement whereby when said head approaches said base there is a component of force which causes said dies to grip the ends of said stock piece whereby the aforesaid separating movement imparted to the dies causes said stock piece to be pulled apart into two sections.

12. A machine for forming harrow teeth or the like comprising a power press having an upper vertically movable head, a relatively stationary base, and means for raising and lowering said head, two pairs of upper and lower bar-receiving grippers adapted to engage and grip the end portions of a heated bar from which two harrow teeth are to be formed, means connecting the lower pair of grippers with the base for lateral separating movement relative thereto, means connecting the upper pair of grippers with said head for lateral separating movement relative thereto, yielding means opposing lateral separating movement of at least one pair of grippers, whereby when the head is moved toward the base the upper of said grippers are brought down against the lower of said grippers to clamp said bar therebetween and the pairs of grippers separated to stretch the central part of said bar and separate the latter into two sections, forming two pointed teeth thereby, and means engaging certain of said grippers to prevent said pairs approaching one another when the press head is raised so as to prevent the pointed portions of said bar from touching while still heated.

13. A machine for forming harrow teeth or the like comprising a power press having an upper vertically movable head, a relatively stationary base, and means for raising and lowering said head, two pairs of upper and lower bar-receiving grippers adapted to engage and grip the end portions of a heated bar from which two harrow teeth are to be formed, means connecting the lower pair of grippers with the base for lateral separating movement relative thereto, means connecting the upper pair of grippers with said head for lateral separating movement relative thereto, yielding means opposing lateral separating movement of at least one pair of grippers, whereby when the head is moved toward the base the upper of said grippers are brought down against the lower of said grippers to clamp said bar therebetween and the pairs of grippers separated to stretch the central part of said bar and separate the latter into two sections, forming two pointed teeth thereby, means engaging certain of said grippers to prevent said pairs approaching one another when the press head is raised so as to prevent the pointed portions of said bar from touching while still heated, and means for removing said teeth from said grippers while said gripper-engaging means holds said pairs of grippers from approaching one another.

14. A machine for forming harrow teeth or the like comprising a power press having an upper vertically movable head, a relatively stationary base, and means for raising and lowering said head, two pairs of upper and lower bar-receiving grippers adapted to engage and grip the end portions of a heated bar from which two harrow teeth are to be formed, means connecting the lower pair of grippers with the base for lateral separating movement relative thereto, means connecting the upper pair of grippers with said head for lateral separating movement relative thereto, yielding means opposing lateral separating movement of at least one pair of grippers, whereby when the head is moved toward the base the upper of said grippers are brought down against the lower of said grippers to clamp said bar therebetween and the pairs of grippers separated to stretch the central part of said bar and separate the latter into two sections, forming two pointed teeth thereby, means engaging certain of said grippers to prevent said pairs approaching one another when the press head is raised so as to prevent the pointed portions of said bar from touching while still heated, and abutment means carried by the press base adjacent the outer ends of said teeth for engaging and upsetting said outer tooth ends to form heads thereon generally at the end of said bar-separating action.

15. For use with a power press having a relatively stationary base, and a head movable toward and away from said base, the improvement in means for shaping heated metal pieces which comprises upper and lower piece-engaging die means, the upper piece-engaging die means including a pair of piece-receiving blocks, parallel link means adapted to pivotally connect each of said blocks with said head, said link means being adapted to extend downwardly from said head in diverging relation, said lower piece-engaging die means including a pair of piece-receiving blocks, parallel link means adaped to pivotally connect each of said blocks with said base, said upper and lower blocks being adapted to be brought into engagement when said head is lowered, further lowering movement of said head causing the upper and lower blocks at one side to move laterally away from the upper and lower blocks at the other side, a part disposable between said upper link means when the press head is raised, and means for holding said part away from the upper link means when the press head is lowered.

16. For use with a power press having a relatively stationary base, and a head movable toward and away from said base, the improvement in means for shaping heated metal pieces which comprises upper and lower piece-engaging die means, the upper piece-engaging die means including a pair of piece-receiving blocks, parallel link means adapted to pivotally connect each of said blocks with said head, said link means being adapted to extend downwardly from said head in diverging relation, said lower piece-engaging die means including a pair of piece-receiving blocks, parallel link means adapted to pivotally connect each of said blocks with said base, said upper and lower blocks being adapted to be brought into engagement when said head is lowered, further lowering movement of said head causing the upper and lower blocks at one side to move laterally away from the upper and lower blocks at the other side, biasing means acting against upper link means for urging them to move toward one another, an arm adapted to be pivotally connected with said press, a part carried by said arm adjacent said upper link means, biasing means acting against said arm for disposing said part in a position between portions of said upper link means so as to prevent said upper blocks from moving toward one another while the head is being raised, and means responsive to lowering movement of said head for holding said arm and part out of engagement with said upper link means.

17. For use with a power press having a stationary base section and an upper movable head section, the improvement in means for forming harrow teeth or the like from stock pieces each having a length equal substantially to the length of two of said teeth, which improvement comprises an upper pair of dies, a lower pair of dies, sets of parallel link means for connecting said upper and lower dies to said press head and base sections, whereby the dies of each pair are adapted to be moved toward or away from each other, means for causing the upper and lower dies to move laterally together, one set of said parallel link means being adapted to be disposed at an acute angle to the line of movement of the press head whereby there is a component of the movement of the dies toward one another to cause said dies to separate, and means for imposing a biasing force against only the upper pair of said dies to yieldably resist their separating movement and thus increase the forces with which said dies engage a stock piece therebetween by downward movement of said head section.

18. A machine for forming harrow teeth or the like comprising a power press having an upper vertically movable head, a relatively stationary base, and means for raising and lowering said head, two pairs of upper and lower bar-receiving grippers adapted to engage and grip the end portions of a heated bar from which two harrow teeth are to be formed, means connecting said grippers with said head and base so that when the head is moved toward the base the upper of said grippers are brought down against the lower of said grippers to clamp said bar therebetween and then the pairs of grippers separated to stretch the central part of said bar and separate the latter into two sections, forming two pointed teeth thereby, centering mechanism carried by said base and including laterally shiftable bar-engaging parts and spring means urging said parts into bar-engaging position, abutment means carried by said bar-engaging parts adjacent the outer ends of said teeth for engaging and upsetting said outer tooth ends to form heads thereon generally at the end of said bar-separating action, means for ejecting the formed teeth, and stop means controlled by the movement of said press head for holding the bar-engaging parts of said centering mechanism in their outer positions during the operation of said ejecting means.

19. A device for shaping elongated heated metal pieces, comprising a pair of grippers adapted to grip one end of said heated metal piece, a pair of relatively movable supports movable toward and away from one another, means carried by said supports and actuated by movement thereof toward one another for gripping the other end of said piece, means for connecting each gripper with the associated support whereby the pair of grippers are capable of moving together generally transversely relative to the direction of relative movement of said supports, said means including parts pivotally connected between said supports and said grippers, respectively, said parts being disposed at an angle to the direction of relative movement of said supports whereby when said grippers are forced against a piece therebetween one component of force causes said grippers to clamp said one end of said piece therebetween and another component of force moves said one end of said piece away from the other end, and means for yieldably opposing transverse movement of said grippers for increasing the amount of gripping pressure exerted through said grippers relative to the amount of the transversely directed component of force exerted through the grippers.

20. For use with a press having a stationary base and a head movable by power toward and away from said base, the improvement comprising means for forming harrow teeth or the like from stock pieces each having a length equal substantially to the length of two teeth, which means includes a pair of stock-piece-receiving dies adapted to be carried by each of said head and base, said pairs of dies being formed to grip the ends of a stock piece therebetween, means for mounting the dies of each of said pair of dies on the associated base or head for lateral movement toward and away from each other, said means being constructed and arranged so that movement of said head toward said base causes the dies of each pair to separate laterally, and means for resiliently opposing said separating movement whereby when said head approaches said base there is a component of force which causes said dies to grip the ends of said stock piece whereby the aforesaid separating movement imparted to the dies causes said stock piece to be pulled apart into two sections.

21. A device for shaping elongated heated metal pieces, comprising a pair of grippers adapted to grip one end of said heated metal piece, a pair of relatively movable supports movable toward and away from one another, means carried by said supports and actuated by movement thereof toward one another for gripping the other end of said piece, means for connecting each gripper with the associated support whereby the pair of grippers are capable of moving together generally transversely relative to the direction of relative movement of said supports, said means including parts pivotally connected between said supports and said grippers, respectively, said parts being disposed at an angle to the direction of relative movement of said supports whereby when said grippers are forced against a piece therebetween one component of force causes said grippers to clamp said one end of said piece therebetween and another component of force moves said one end of said piece away from the other end, and means for yieldably opposing transverse movement of said grippers for increasing the amount of gripping pressure exerted through said grippers relative to the amount of the transversely directed component of force exerted through the grippers.

DONALD A. WANGELIN.

REFERENCES CITED

The following references are of record in the file of this patent:

UNITED STATES PATENTS

| Number | Name | Date |
| --- | --- | --- |
| 396,014 | Thomson | Jan. 8, 1889 |
| 953,041 | Lachman | Mar. 29, 1910 |
| 1,344,961 | Remington | June 29, 1920 |
| 2,042,843 | Harvey | June 2, 1936 |
| 2,131,254 | Miller | Sept. 27, 1938 |
| 2,134,186 | Harvey | Oct. 25, 1938 |
| 2,299,778 | Wissler | Oct. 27, 1942 |